Sept. 20, 1932. J. R. JOHNSON 1,878,707

RIGHT ANGLE MILLING AND BORING ATTACHMENT FOR MILLING MACHINES

Filed June 23, 1927 2 Sheets-Sheet 1

Inventor:
John R. Johnson
By Wilson & McCanna
Attys.

Sept. 20, 1932.   J. R. JOHNSON   1,878,707
RIGHT ANGLE MILLING AND BORING ATTACHMENT FOR MILLING MACHINES
Filed June 23, 1927   2 Sheets-Sheet 2
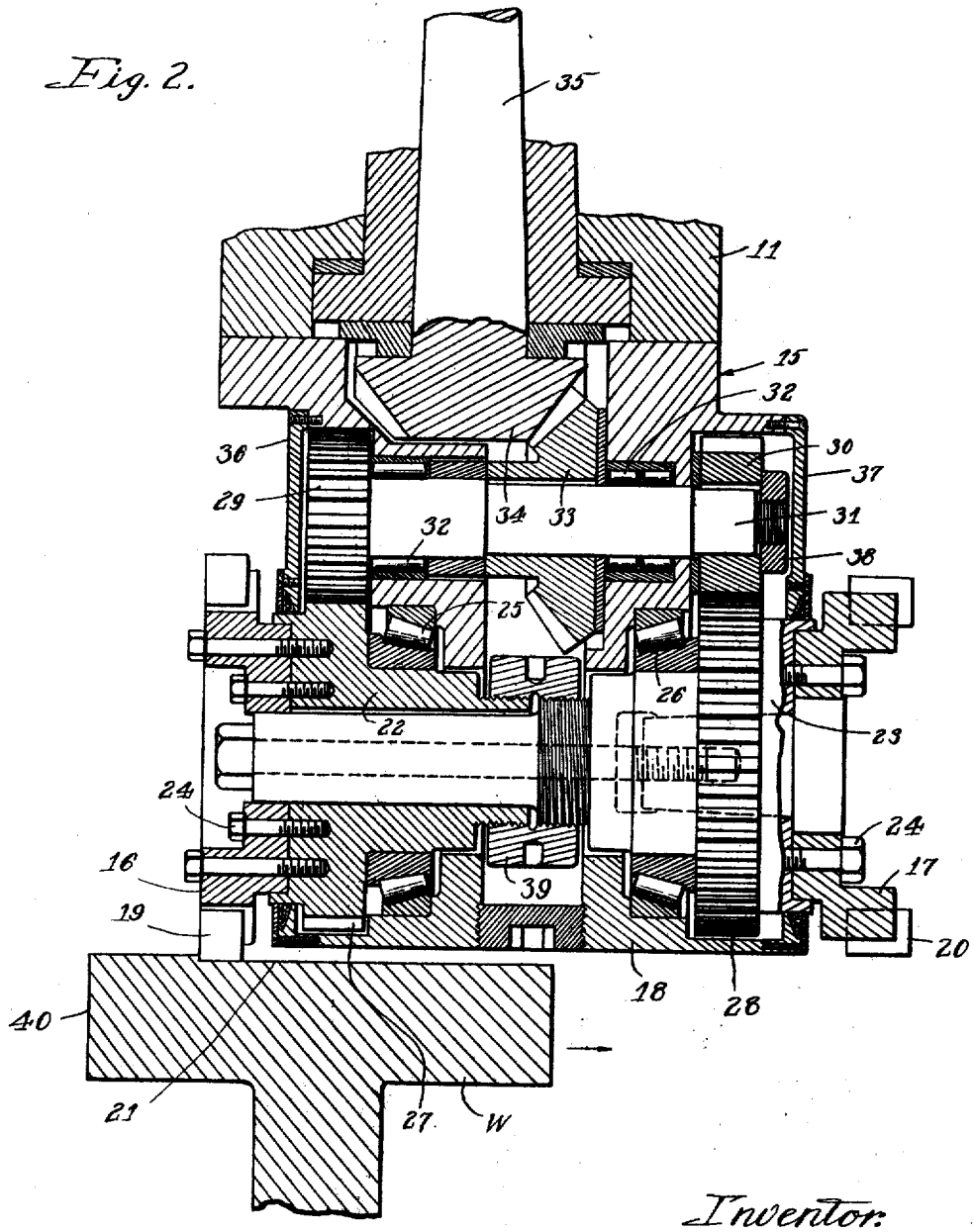

Patented Sept. 20, 1932

1,878,707

UNITED STATES PATENT OFFICE

JOHN R. JOHNSON, OF ROCKFORD, ILLINOIS, ASSIGNOR TO THE INGERSOLL MILLING MACHINE COMPANY, OF ROCKFORD, ILLINOIS, A CORPORATION OF ILLINOIS

RIGHT ANGLE MILLING AND BORING ATTACHMENT FOR MILLING MACHINES

Application filed June 23, 1927. Serial No. 200,839.

This invention relates to an improvement in milling machines and is particularly concerned with a right angle milling and boring attachment designed especially for use with the vertical spindle head on the cross rail of a horizontal type machine.

The invention finds particular utility in the performance of boring operations where a series of bores or two or more widely spaced bores have to be produced and the work cannot be handled conveniently on a boring machine by reason of the great length of boring bar which would be required, making it extremely difficult, if not impossible, to produce the bores in accurate alignment. In other words, the present invention when applied to a milling machine renders the performance of such operations on a boring machine relatively impractical, the reason being that the number of trueing-up operations necessitated in the case of the boring bar slows up production and renders it practically impossible to get the desired degree of accuracy, whereas in the case of the milling machine the cutter head need not be disturbed once it is properly set, and the trueing-up operations are eliminated, thus making it possible to produce the bores to the closest practicable limits of accuracy. Furthermore, a milling machine equipped with the present invention not only performs the boring operation but is arranged with the work still in position on the table to perform whatever face milling operations are required. The saving in cost and time which is thereby derived may be readily appreciated. Where the boring operation was performed on a boring machine it was, of course, necessary to dismount the work and make a second set-up thereof on the table of the milling machine.

According to the present invention, the attachment embodies two cutter heads coaxially arranged fore and aft, the one cutter head having peripheral teeth for cutting on the radius of the bore in the performance of boring operations while the other cutter head has teeth in the face thereof on a substantially smaller radius than the peripheral teeth and arranged to perform face milling operations, as for example on the bosses at the ends of the bores, the two cutter heads having a right angle driving connection with the driven spindle of the vertical spindle head of the machine.

The invention is illustrated in the accompanying drawings, wherein—

Fig. 2 is an enlarged vertical section through the attachment taken on the line 2—2 of Fig. 1 looking in the direction of the arrows.

Figure 1:
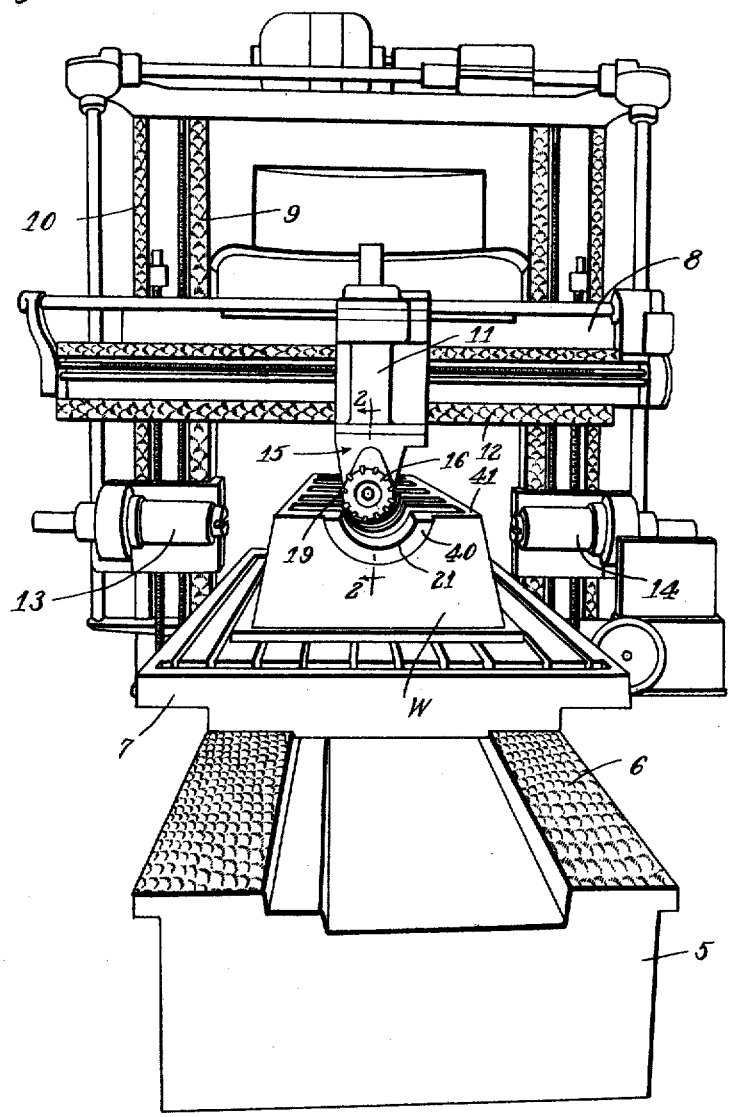
Fig. 1 is a perspective view of a milling machine equipped with the novel right angle milling and boring attachment and shown performing a boring operation on a Diesel engine crank case in acordance with my improved method, the view being taken looking from one end of the bed overlooking the table and the work thereon.

The invention is illustrated as applied to a conventional horizontal rail type milling machine, comprising a bed 5 having ways 6 thereon for the back and forth operation of a table 7. A cross rail 8 is adjustable up and down relative to the table 7 on ways 9 provided on the side housings 10 which are disposed approximately mid-way of the length of the bed 5. Machines of this type have commonly been provided with vertical spindle heads 11 adjustable crosswise relative to the table 7 on ways 12 provided on the cross rail 8. In many cases more than one vertical spindle head is provided and oftentimes horizontal spindle heads, such as those shown at 13 and 14, are provided mounted for up and down adjustment on the ways 9 of the side housings 10. It has been common practice to provide these spindle heads with face mills to operate on the work from three sides.

According to the present invention, I provide a right angle milling and boring attachment 15 for the vertical spindle head 11 having cutter heads 16 and 17 disposed coaxially fore and aft with respect to the housing 18 of the attachment. The head 16 has bits or teeth 19 inserted in the periphery thereof for the performance of boring operations, the teeth operating on a radius according to the size of the bore to be produced and projecting substantially beyond the housing 18 as clearly appears in Fig. 2. The cutter head 17 on the other hand has bits or teeth 20 inserted therein projecting from the front face thereof to be used in face milling operations, these teeth being arranged to operate on a substantially smaller radius than the teeth 19 as shown. Thus the work indicated at W may be fed in the direction of the arrow in Fig. 2 for the cutting of a bore 21 by the teeth 19, there being ample clearance between the bore 21 and the housing 18 and teeth 20. The body portions of the cutter heads 16 and 17 are suitably demountable from mandrels 22 and 23, being fastened in place by means of a plurality of cap screws 24. This permits the replacement and substitution of cutter heads to suit requirements, and permits removal of the cutter head 16 after the boring operation is finished, and the substitution of another head like them milling head 17, to permit face milling from either side of the attachment. The mandrels 22 and 23 are suitably received in anti-friction bearings 25 and 26 in the housing 18. Gear teeth 27 and 28 are provided on the mandrels 22 and 23 meshing with pinions 29 and 30 provided on a stub shaft 31 received in bearings 32 in the housing 18 and disposed in parallel relation to the coaxially arranged heads 16 and 17. This double end drive gives rigidity and prevents deflection due to torque windup, and is of advantage in that the drive in any case is right next to the cutter head being used. The shaft 31 has a bevel gear 33 keyed thereon intermediate the ends thereof meshing with the bevel gear 34 turning with the driven spindle 35 of the vertical spindle head 11. Suitable means are provided for bolting the housing 18 to the head 11 to maintain the proper meshing engagement of the bevel gears 33 and 34. Cover plates 36 and 37 at the opposite ends of the housing 18 serve to enclose the parts therein and are removable to permit access thereto. The shaft 31 is removable endwise when the nut 38 holding the gear 30 in place is removed. The mandrels 22 and 23 are detachably coupled by the collar 39.

When operating according to the present improved method, the bearings of a Diesel engine crank case which is indicated as the work at W in Fig. 1 may be bored very accurately and in a minimum space of time. The work is placed on the table 7 and properly lined up, whereupon the spindle head 11 is accurately lined up therewith and the table feed is thrown in to feed the work to the head 16 to bore out one bearing after another each in true alignment with the others. Once the head is properly set and the cross rail lowered for the desired depth of cut, it is not disturbed and there is nothing to affect the accuracy with which all of the bearings are bored out in true relationship to one another. It is hardly necessary to contrast this method of operation with that employed in the performance of the same operation on a boring machine to bring out the fact that this method of operation is bound to be more accurate, and certainly such a comparison is not required to make evident the great saving in time and the consequent saving in cost which are herein afforded. In the case of boring operations such as that referred to in the present invention the overall length of the work is oftentimes upwards of 30'. The use of a boring bar to operate along work of such length is rendered impractical by reason of the considerable amount of deflection of the bar. The use of steady rests is thus dictated, but there is nevertheless the absolute necessity for repeated trueing-up operations which consume time and very seldom result in the desired degree of accuracy. The cost of performing boring operations of the kind contemplated according to the old method was consequently prohibitive. Furthermore, where the boring operation was performed on a boring machine, it was necessary to dismount the work from the boring machine after the boring operation and move it to a milling machine where the facing operations might be performed. This was obviously a time consuming factor and, of course, a considerable labor cost was involved. In the present case, however, the machine is also arranged to perform the facing operations with the work still set up on the table. In these operations the boring head 16 is removed and another milling head like the head 17 is substituted therefor, and the table is brought into a position where the spindle head 11 is disposed between two bearings so that the cross rail 8 may be lowered to perform a face milling operation, as for example on both ends 40 of the boss of a bearing. The cross feed for the spindle head 11 is also arranged to be thrown into feed the head 17 laterally with respect to the work. Any other operations, such as the milling off of pads on the opposite sides of the crank case, may be performed by face mills mounted on the horizontal heads 13 and 14, and the top 41 of the crank case may, of course, be milled off by a face mill mounted on the spindle head 11, the attachment 15 being readily removable for that purpose.

It is believed the foregoing description conveys a clear understanding of my invention, and while the same has been illustrated and described as applied to a specific embodiment, it will be apparent that certain changes may be made in the design or construction without departing from the spirit of the invention. For this reason, the appended claims have been drawn to cover any legitimate modification or adaptation of the invention which may suggest itself to one skilled in the art as a result of this disclosure.

I claim:

1. In a milling machine having a spindle head containing a driven spindle, an attachment for said head of the character described comprising a housing detachably mounted on said spindle head, a pair of cutter heads for different purposes mounted in the opposite ends of said housing on axes at right angles to the driven spindle, and an intermediate driven shaft disposed parallel with said cutter heads within said housing having separate gearing connections at the opposite ends thereof with said cutter heads to drive the same at suitable speeds, and having a driving connection with said spindle intermediate its ends.

2. In a milling machine having a spindle head containing a driven spindle, an attachment for said head of the character described comprising a housing detachably mounted on said spindle head, a pair of separate coaxially arranged mandrels received in bearings in the opposite ends of said housing, an intermediate driven shaft arranged in parallel relation to said mandrels and at right angles to the driven spindle, said shaft having separate gearing connections with said mandrels at opposite ends thereof and having a quarter-turn gearing connection with the driven spindle, and cutter heads detachably mounted on said mandrels, one of said cutter heads having bits projecting from the periphery thereof and substantially beyond the housing, suitable for radius cutting as in the performance of boring operations, and the other cutter head having bits projecting therefrom on a substantially smaller radius than the first bits so that it will clear work operated upon by the first head.

3. In a milling machine having a vertically adjustable cross rail, a table movable on ways therebeneath, and a vertical spindle head mounted on said cross rail and arranged for adjustment along the same crosswise relative to said table, said head containing a driven spindle, a right angle milling and boring attachment for said head comprising a housing detachably mounted on said head, a pair of cutter heads mounted fore and aft in said housing on horizontal axes at right angles to the vertical spindle head, at least the one cutter head projecting below the housing and being adapted for peripheral milling, whereby to do radius cutting, as for boring operations, wherein the table is fed toward the spindle head and the latter is held stationary with the cross rail, and the other head having bits projecting on a substantially smaller radius to perform other milling operations and so as not to interfere with the operation of the first head just mentioned, and means providing a different ratio driving connection between each of said cutter heads and said driven spindle so that each head is driven at a speed proper for the work to be done thereby.

4. In a milling machine having a vertically adjustable cross rail, a table reciprocable on ways therebeneath, and a vertical spindle head mounted on said cross rail and arranged for adjustment along the same crosswise relative to said table, said head containing a driven spindle, a right angle milling and boring attachment for said head comprising a housing detachably mounted on said head, cutter heads mounted fore and aft in said housing on horizontal axes at right angles to the vertical spindle head, and means providing a driving connection between said cutter heads and said driven spindle, one of said cutter heads having bits projecting from the periphery thereof and substantially beyond the housing to serve in the performance of boring operations, wherein the table is fed toward the spindle head and the latter is held stationary with the cross rail, and the other cutter head having bits projecting from the front face thereof on a substantially smaller radius than the first bits for performing face milling operations, wherein the table is held stationary and either or both the spindle head and the cross rail are adjusted in relation thereto.

5. In a milling machine having a reciprocable table, a spindle head comprising a housing containing a vertical driven spindle, a pair of cutter heads carried by the spindle head housing for operation on axes at right angles to the driven spindle, said housing being fixed so that each cutter head axis is parallel to the direction of table movement, one of said heads projecting below the housing and being adapted for peripheral milling, such as radius cutting as in performing boring operations, and the other head being arranged so it does not project as low as the first head for the reasons stated herein, the second head being adapted for other milling, and means providing a separate driving connection between the driven spindle and each of said heads.

6. In a milling machine, a spindle head containing a vertical driven spindle, a pair of cutter heads carried by said spindle head disposed on a substantially horizontal axis at right angles to the driven spindle, an intermediate driven shaft disposed parallel to the axis of the cutter heads having separate gearing connections at the opposite ends thereof with said cutter heads, and means providing a driving connection between said spindle and said shaft intermediate the ends of the latter.

7. In a milling machine, a spindle head containing a vertical driven spindle, a pair of mandrels received in bearings carried by said head in right angle relation to the driven spindle, an intermediate shaft disposed in parallel relation to the mandrels, said shaft having separate gearing connections with each of said mandrels and having a quarter-turn gearing connection with the driven spindle, and cutter heads detachably mounted on said mandrels.

8. In a milling machine, a spindle head containing a vertical driven spindle, a pair of mandrels received in bearings carried by said head in right angle relation to the driven spindle, an intermediate shaft disposed in parallel relation to the mandrels, said shaft having separate gearing connections with each of said mandrels and having a quarter-turn gearing connection with the driven spindle, a cutter head mounted on one of said mandrels adapted for peripheral milling, such as radius cutting as in performing boring operations, and another cutter head mounted on the other mandrel adapted for face milling.

In witness of the foregoing I affix my signature.

JOHN R. JOHNSON.

---

CERTIFICATE OF CORRECTION.

Patent No. 1,878,707.  September 20, 1932.

JOHN R. JOHNSON.

It is hereby certified that error appears in the printed specification of the above numbered patent requiring correction as follows: Page 3, strike out lines 37 to 62, inclusive, comprising claim 3; same page, lines 63, 90, 108, 119 and 130, for claim numbers "4, 5, 6, 7 and 8" read "3, 4, 5, 6 and 7"; and that the said Letters Patent should be read with these corrections therein that the same may conform to the record of the case in the Patent Office.

Signed and sealed this 6th day of December, A. D. 1932.

(Seal)

M. J. Moore,
Acting Commissioner of Patents.

mandrels received in bearings carried by said head in right angle relation to the driven spindle, an intermediate shaft disposed in parallel relation to the mandrels, said shaft having separate gearing connections with each of said mandrels and having a quarter-turn gearing connection with the driven spindle, a cutter head mounted on one of said mandrels adapted for peripheral milling, such as radius cutting as in performing boring operations, and another cutter head mounted on the other mandrel adapted for face milling.

In witness of the foregoing I affix my signature.

JOHN R. JOHNSON.

CERTIFICATE OF CORRECTION.

Patent No. 1,878,707.  September 20, 1932.

JOHN R. JOHNSON.

It is hereby certified that error appears in the printed specification of the above numbered patent requiring correction as follows: Page 3, strike out lines 37 to 62, inclusive, comprising claim 3; same page, lines 63, 90, 108, 119 and 130, for claim numbers "4, 5, 6, 7 and 8" read "3, 4, 5, 6 and 7"; and that the said Letters Patent should be read with these corrections therein that the same may conform to the record of the case in the Patent Office.

Signed and sealed this 6th day of December, A. D. 1932.

(Seal)

M. J. Moore,
Acting Commissioner of Patents.

CERTIFICATE OF CORRECTION.

Patent No. 1,878,707.  September 20, 1932.

JOHN R. JOHNSON.

It is hereby certified that error appears in the printed specification of the above numbered patent requiring correction as follows: Page 3, strike out lines 37 to 62, inclusive, comprising claim 3; same page, lines 63, 90, 108, 119 and 130, for claim numbers "4, 5, 6, 7 and 8" read "3, 4, 5, 6 and 7"; and that the said Letters Patent should be read with these corrections therein that the same may conform to the record of the case in the Patent Office.

Signed and sealed this 6th day of December, A. D. 1932.

M. J. Moore,
Acting Commissioner of Patents.

(Seal)